United States Patent Office
3,110,704
Patented Nov. 12, 1963

3,110,704
LOW PRESSURE TETRAFLUOROETHYLENE
POLYMERIZATION PROCESS
Ronald Harry Halliwell, Parkersburg, W. Va., assignor to
E. I. du Pont de Nemours and Company, Wilmington,
Del., a corporation of Delaware
No Drawing. Filed Mar. 31, 1960, Ser. No. 18,879
7 Claims. (Cl. 260—92.1)

This invention relates to improvements in polymerizing tetrafluoroethylene, and more particularly to an improved process wherein the formation of adhesions of polymer in the polymerization reactor is minimized.

Various methods are known for the polymerization of tetrafluoroethylene to resinous products. In typical commercial operations such polymerizations have been carried out at temperatures in the range of 50° C. to 110° C. in aqueous media containing free radical initiators and under pressures in the range of 10 to 100 atmospheres. However, considerable inconvenience has been due to the tendency for adhesions of polymer to form on the walls of the reactor. Because of this phenomenon, it has invariably been the practice to prepare tetrafluoroethylene polymers by batch methods, shutting down at intervals in order to clean out the adhesions from the reactor. In addition it has been necessary to grind or cut the polymers produced to render them suitable for general commercial use, since as made they contain hard compacted lumps and stringy particles.

Efforts to minimize these inconveniences by modifying temperature, pressure, and catalyst system have hitherto been unsuccessful, leading only to decreased productivity and/or inferior products.

It is a general object of the present invention to provide an improved process for the polymerization of tetrafluoroethylene. More particularly it is an object to provide an improved process for the polymerization of tetrafluoroethylene in which the tendency for adhesions to form in the polymerization reactor is minimized. Yet a further object is to provide a process of improved productivity for the polymerization of tetrafluoroethylene in a semi-continuous or continuous manner. Other objects will be apparent hereinafter.

According to the present invention, it has been found that notwithstanding earlier findings these and other desirable objects can be achieved by a process which comprises contacting tetrafluoroethylene at a temperature in the range of 30° C. to 80° C. with an aqueous inorganic redox initiator system and a copper accelerator, under a pressure in the range of 0.6 to 4 atmospheres absolute. The invention is more particularly described and explained in the ensuing paragraphs and illustrative and comparative examples, in which except as otherwise stated, all parts and percentages are by weight and all pressures are absolute.

*Example I*

An electrically-stirred, water-steam jacketed, stainless steel autoclave of 850 parts water capacity is evacuated; charged with 595 parts of deoxygenated distilled water containing, per million parts, 5000 parts borax, 100 parts each of ammonium persulfate, sodium bisulfite, and ammonium perfluorocaprylate, and 0.4 part copper as copper sulfate; heated to 55° C.; pressured with tetrafluoroethylene to 1.3 atmospheres and stirred at an agitator speed of 600 r.p.m. Polymerization commences shortly after the tetrafluoroethylene is added. The reaction is continued for about 3 hours, during which time stirring is continued at 600 r.p.m.; temperature is held at 55–60° C.; pressure is held at 1.3 to 1.7 atmospheres by addition of tetrafluoroethylene; after the solids content in the autoclave reaches about 25% a mixture of polymer and water is intermittently withdrawn through a draw-off valve at the bottom of the autoclave; and make-up quantities of deoxygenated water containing 100 parts per million each of ammonium persulfate and sodium bisulfite are intermittently added so as to maintain the liquid level in the autoclave. It is observed that the power required to maintain stirrer speed remains substantially constant throughout the run. At the conclusion of the run, the autoclave is drained, flushed once with water, and found to be free of polymer adhesions. There is obtained after drying a total of 326 parts of fine, sandy, free-flowing granular polymer corresponding to a space time yield of 300 g./liter/per hour. The polymer so obtained readily passes a 0.25 inch mesh sieve, is of high molecular weight as determined by specific gravity measurements on a molded chip, and shows commercially acceptable powder flow properties.

In a series of comparable runs in the same equipment at pressures of 10 to 15 atmospheres via batch methods without copper and without ammonium perfluorocaprylate, the power requirement to maintain stirrer speed is approximately doubled after about 200 parts of polymer is produced. The polymer obtained contains on the average about 10% of stringy, agglomerated or compacted particles which fail to pass a 0.25 inch mesh screen. The instantaneous reaction rate during polymerization is in the range of 600 to 800 grams per liter per hour. However, because it is necessary at frequent intervals to stop the reaction and clean the reactor by hand so as to remove polymer adhesions, the overall maximum production rate by this procedure is only about 200 grams per liter per hour.

*Example II*

A water-steam jacketed, glass reactor, of 2 parts water capacity and equipped with a magnetically actuated stainless-steel stirrer, is evacuated; charged with 1.2 parts of deoxygenated distilled water containing, per million parts, 5000 parts borax, 100 parts ammonium persulfate and 100 parts sodium bisulfite; heated to 42° C.; pressured from a metered continuous source to 1.1 atmospheres with tetrafluoroethylene; and agitated at a stirrer speed of 600 r.p.m. Polymerization commences shortly after pressuring with tetrafluoroethylene. The reaction is continued while maintaining temperature at 42° C. to 44° C., pressure at 1.1 atmospheres, and stirring rate at 600 r.p.m., and produces polymer at a steady rate of about 8.5 grams/liter/hour, as determined by tetrafluoroethylene take-up. Addition of copper (as sulfate) to the reaction mixture in amount of 0.025 part per million parts of liquid rapidly increases reaction rate to 13 g./liter/hour. Addition of a further like amount of copper further increases the rate to 24 g./liter/hour. The polymer obtained is sandy, free-flowing, and free of adhesions. In continued running, the accelerating effect of the copper diminishes, apparently due to plating out on the stirrer. Optimum rate, however, is maintained by addition of copper at the rate of 0.1 part per hour per million parts of liquid. Copper present in markedly higher amounts, however, functions as an inhibitor, and maximum benefit is obtained at copper concentrations in the range of 0.02 to 2 parts per million parts of the liquid medium.

*Example III*

The procedure of Example II is repeated to establish an initial reaction rate of about 8 grams/liter/hour; thereafter there is added ammonium perfluorocaprylate in amount of 100 parts, per million parts of liquid. The rate slowly increases to 25 g./liter/hour. Following establishment of the 25 g./liter/hour rate, there is added copper sulfate to provide copper in amount of 0.02 part per million parts of liquid and the rate increases rapidly to 44 g./liter/hour. In companion experiments, acceleration similar to that obtained with ammonium perfluorocaprylate is also obtained with other highly halogenated dispersing agents which are substantially inert chemically under the reaction conditions.

*Example IV*

The procedure of Example III is repeated except that 250 parts of ammonium perfluorocaprylate per million parts of liquid are employed, and the initial rate is established at 28 g./liter/hour, after which there is added silver (as silver nitrate) in amount of 2 parts per million parts of liquid. The rate increases slowly to 35 grams/liter/hour. However, further addition of 0.2 part copper on the same basis rapidly further increases the rate to 100 grams/liter/hour.

In comparable experiments iron and cobalt show effects similar to silver, while copper used with other deoxygenated inorganic redox systems such as periodate/bisulfite, hydrogen peroxide/sulfite, and the like, produces a much more rapid acceleration than silver, but is not as effective as the copper-accelerated ammonium and alkali metal persulfates/bisulfite.

*Example V*

Further improvement over the results of Example IV is obtained by thorough agitation of the medium, careful purification of the tetrafluoroethylene employed, and careful prewashing of the equipment with hot aqueous persulfate/bisulfite solution containing 1000 parts per million ammonium perfluorocaprylate. Using these modifications in the procedure of Example III and adding copper at the rate of 0.5 part per million per hour produces polymer at a rate of 225 grams/liter/hour.

Under the same conditions, using a tubular glass reactor of about 5 parts water capacity fitted with a stirrer and a discharge exit adapted to filter out polymer and return the aqueous liquor to the reaction zone, a continuous reaction of about 30 hours duration is carried out, producing polymer at rates of 100 to 150 grams/liter/hour. Both the reactor and the discharged polymer remain free of adhesions and stringy particles, throughout the run. The polymer as discharged and dried is of high molecular weight, and exhibits suitable particle size and powder flow rate characteristics for general commercial use.

In the practice of the present invention reaction temperature is desirably 30° C. to 80° C. and preferably 40° C.–65° C. Any inorganic redox system may be used, but the ammonium and alkali metal persulfates, together with bisulfite, are preferred. With the prepared bisulfite/persulfate systems, concentrations per million parts of liquid medium are desirably 5–180 parts and preferably 20–90 parts persulfate ion, and desirably 10–360 parts, preferably 80–180 parts bisulfite ion. Copper ion is employed in concentrations of 0.02 to 2, and preferably 0.1 to 0.5 part per million parts of aqueous medium. Preferably a sufficient quantity of buffering agent such as borax is included so as to maintain the pH of the medium relatively constant and preferably alkaline during the course of the reaction. Dispersing agents where employed as accelerators are used desirably at 1 to 500 and preferably 50 to 100 parts, per million parts of aqueous medium. Where highly purified ingredients and scrupulously cleansed equipment are employed, the acceleration observed due to presence of dispersing agent is small, and accordingly their use under these conditions is not essential in achieving practical reaction rates.

The process of the present invention may be carried out batchwise, but is preferably performed in a semi-continuous or continuous manner in order to achieve maximum productivity. In order to minimize the tendency for the reaction product of a continuously or semi-continuously produced material to contain low molecular weight products, the reaction mixture may be discharged from the continuous or semi-continuous reactor into a finishing reactor, where it is further maintained in contact with tetrafluoroethylene without further addition of catalyst until a more uniformly high molecular weight product is obtained. Various other modifications of the process of the invention will be apparent to those skilled in the art.

In addition to the aforementioned advantages of minimized adhesion formation, increased productivity, and good flow properties of the product as made, the process of the invention also permits equipment savings due to the fact that it is carried out at approximately atmospheric rather than markedly superatmospheric pressures, so that expensive pressure-resistant vessels are not needed. Moreover the tendency for spontaneous explosive reaction of tetrafluoroethylene is minimized at the low pressures involved.

I claim:

1. A process for polymerizing tetrafluoroethylene which comprises contacting tetrafluoroethylene at a temperature in the range of 30° C. to 80° C. with an aqueous polymerization medium containing an inorganic redox initiator system and copper ion accelerator, at a pressure in the range of 0.6 to 4 atmospheres absolute.

2. A process for polymerizing tetrafluoroethylene which comprises contacting tetrafluoroethylene at a temperature in the range of 30° C. to 80° C., with an aqueous polymerization medium containing, per million parts by weight, 5 to 180 parts persulfate ion and 10 to 360 parts bisulfite ion as an inorganic initiator system and 0.02 to 2 parts copper ion accelerator, under a pressure in the range of 0.6 to 4 atmospheres absolute.

3. A process for polymerizing tetrafluoroethylene which comprises contacting tetrafluoroethylene at a temperature in the range of 30° C. to 80° C. with an aqueous polymerization medium containing, per million parts by weight, 5 to 180 parts persulfate ion and 10 to 360 parts bisulfite ion as an inorganic initiator, and 0.02 to 2 parts copper ion and 1 to 500 parts of inert halogenated organic dispersing agent as accelerators, under a pressure of 0.6 to 4 atmospheres absolute.

4. A process for polymerizing tetrafluoroethylene which comprises contacting tetrafluoroethylene at a temperature in the range of 40° C. to 65° C. with an aqueous polymerization medium containing per million parts by weight 10 to 90 parts persulfate ion, 40 to 180 parts bisulfite ion as inorganic initiator system, and 0.1 to 0.5 part copper ion accelerator under a pressure in the range of 1 to 2 atmospheres absolute.

5. A process for polymerizing tetrafluoroethylene which comprises contacting tetrafluoroethylene at a temperature in the range of 40° C. to 65° C. with an aqueous solution consisting essentially per million parts by weight, of 25 to 100 parts ammonium persulfate, 100 to 200 parts sodium bisulfite, 0.1 to 0.5 part copper as copper sulfate, 50 to 100 parts ammonium perfluorocaprylate, and a borax buffer, the balance being water, under a pressure of 1 to 2 atmospheres absolute.

6. A process for preparing polytetrafluoroethylene which comprises incrementally feeding tetrafluoroethylene to a reaction vessel, polymerizing said tetrafluoroethylene within said vessel at a temperature in the range of 30° C. to 80° C. under a pressure of 0.6 to 4 atmospheres absolute in contact with an aqueous polymerization medium containing per million parts by weight 5 to 180 parts persulfate ion and 10 to 360 parts bisulfite ion as inorganic initiator system and 0.02 to 2 parts copper ion as accelerator, and withdrawing increments of polytetrafluoroethylene from said reaction vessel while continuing said incremental feeding and polymerizing of tetrafluoroethylene.

7. A process for preparing polytetrafluoroethylene which comprises incrementally feeding tetrafluoroethylene and an aqueous medium containing an inorganic redox initiator and copper accelerator to a first reactor, polymerizing said tetrafluoroethylene in contact with said medium in said first reactor at a temperature of 30° C. to 80° C. under a pressure of 0.6 to 4 atmospheres absolute, incrementally withdrawing from the said first reactor successive portions of a mixture of said liquid medium and reaction product, and subjecting said withdrawn portions to further contact with tetrafluoroethylene in a second reactor.

References Cited in the file of this patent

UNITED STATES PATENTS

| | | |
|---|---|---|
| 2,559,752 | Berry | July 10, 1951 |
| 2,820,026 | Passino et al. | Jan. 14, 1958 |